United States Patent
Das et al.

(10) Patent No.: US 8,335,196 B2
(45) Date of Patent: Dec. 18, 2012

(54) ACCOMMODATING WIDEBAND AND NARROWBAND COMMUNICATION DEVICES

(75) Inventors: Arnab Das, Summit, NJ (US); Pablo Alejandro Anigstein, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1447 days.

(21) Appl. No.: 11/856,666

(22) Filed: Sep. 17, 2007

(65) Prior Publication Data

US 2008/0069060 A1 Mar. 20, 2008

Related U.S. Application Data

(60) Provisional application No. 60/845,938, filed on Sep. 19, 2006.

(51) Int. Cl.
H04B 7/212 (2006.01)

(52) U.S. Cl. ......... 370/337; 370/338; 370/344; 370/347

(58) Field of Classification Search ............. 370/203, 370/208, 335, 336, 337, 342
See application file for complete search history.

(56) References Cited

U.S. PATENT DOCUMENTS

| | | | |
|---|---|---|---|
| 6,567,855 B1 | 5/2003 | Tubbs et al. | |
| 6,631,124 B1 * | 10/2003 | Koorapaty et al. | 370/337 |
| 6,662,024 B2 * | 12/2003 | Walton et al. | 455/562.1 |
| 6,876,859 B2 * | 4/2005 | Anderson et al. | 455/456.1 |
| 6,993,333 B2 * | 1/2006 | Laroia et al. | 455/436 |
| 7,047,009 B2 * | 5/2006 | Laroia et al. | 455/437 |
| 7,047,016 B2 * | 5/2006 | Walton et al. | 455/452.1 |
| 7,164,649 B2 * | 1/2007 | Walton et al. | 370/203 |
| 7,382,757 B2 * | 6/2008 | LoGalbo et al. | 370/338 |
| 7,388,845 B2 * | 6/2008 | Laroia et al. | 370/311 |
| 7,391,751 B2 | 6/2008 | Lee et al. | |
| 7,403,470 B2 * | 7/2008 | Lane et al. | 370/203 |
| 7,424,268 B2 * | 9/2008 | Diener et al. | 455/62 |
| 7,574,224 B2 * | 8/2009 | Lane et al. | 455/502 |
| 7,720,479 B2 * | 5/2010 | Laroia et al. | 455/436 |
| 2004/0095880 A1 * | 5/2004 | Laroia et al. | 370/208 |
| 2004/0114618 A1 * | 6/2004 | Tong et al. | 370/431 |
| 2005/0063349 A1 * | 3/2005 | LoGalbo et al. | 370/338 |
| 2005/0085265 A1 * | 4/2005 | Laroia et al. | 455/560 |

FOREIGN PATENT DOCUMENTS

| | | | |
|---|---|---|---|
| JP | 2006311359 A | 11/2006 | |
| JP | 2007521683 A | 8/2007 | |
| TW | I224452 | 11/2004 | |
| TW | I224932 | 12/2004 | |

(Continued)

OTHER PUBLICATIONS

International Search Report, PCT/US07/078948, International Search Authority, European Patent Office, Feb. 19, 2008.

(Continued)

*Primary Examiner* — Robert Wilson
*Assistant Examiner* — Brian O Connor
(74) *Attorney, Agent, or Firm* — Michelle Gallardo; Nicholas J. Pauley; Jonathan T. Velasco

(57) ABSTRACT

Systems and methodologies are described that facilitate supporting narrowband and wideband operation within a wideband wireless communication environment. For example, wideband operation can be enhanced by enabling faster communication of information as compared to narrowband operation, transfer of supplemental data available to wideband devices, and the like. Pursuant to another example, timing of information transfer can be scheduled over a plurality of subbands to enable a narrowband device to obtain a set of information over one of the subbands during a set of time intervals, while a wideband device can receive the set of information over the plurality of subbands during a reduced set of time intervals.

23 Claims, 11 Drawing Sheets

FOREIGN PATENT DOCUMENTS

| | | |
|---|---|---|
| TW | I225747 | 12/2004 |
| WO | 03045082 | 5/2003 |
| WO | 2005013414 | 2/2005 |
| WO | WO 2005020606 | 3/2005 |

OTHER PUBLICATIONS

Written Opinion, PCT/US07/078948, International Search Authority, European Patent Office, Feb. 19, 2008.

* cited by examiner

ACCOMMODATING WIDEBAND AND NARROWBAND COMMUNICATION DEVICES

CROSS-REFERENCE TO RELATED APPLICATIONS

This application claims the benefit of U.S. Provisional Patent application Ser. No. 60/845,938 entitled "ACCOMODATING WIDEBAND AND NARROWBAND COMMUNICATION DEVICES" which was filed Sep. 19, 2006. The entirety of the aforementioned application is herein incorporated by reference.

BACKGROUND

I. Field

The following description relates generally to wireless communications, and more particularly to accommodating narrowband and wideband communication devices in a wireless communication environment.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Each wireless terminal can communicate with one or more base stations via transmissions on forward and reverse links. The forward link (or downlink) refers to the communication link from base stations to wireless terminals, and the reverse link (or uplink) refers to the communication link from wireless terminals to base stations. According to an example, a wireless communication system can leverage a frequency band within a wireless spectrum for communicating via the forward and/or reverse links. Further to this example, in a wideband wireless communication system, wireless terminals oftentimes decode all channels within the frequency band utilized for downlink transmission by base stations. However, conventional techniques can be inefficient since some of the wireless terminals can operate over a smaller bandwidth (e.g., for voice related communication); thus, decoding the entire frequency band (e.g., all channels over which a base station sends information) can waste processing power of these wireless terminals. Moreover, some wireless terminals (e.g., wireless terminals with lesser capabilities) can decode a portion of the frequency band rather than the frequency band in its entirety, and therefore, such wireless terminals that operate over a smaller frequency range commonly can be unsupported by typical wideband wireless communication systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating support of narrowband and wideband operation within a wideband wireless communication environment. For example, wideband operation can be enhanced by enabling faster communication of information as compared to narrowband operation, transfer of supplemental data available to wideband devices, and the like. Pursuant to another example, timing of information transfer can be scheduled over a plurality of subbands to enable a narrowband device to obtain a set of information over one of the subbands during a set of time intervals, while a wideband device can receive the set of information over the plurality of subbands during a reduced set of time intervals According to related aspects, a method that facilitates communicating information to narrowband and wideband devices in a wideband wireless environment is described herein. The method can include transmitting a set of information units for a narrowband wireless terminal via a first subband, the set of information units being transmitted during a first set of time intervals. Further, the method can comprise transmitting the set of information units for a wideband wireless terminal via a plurality of subbands that includes the first subband, the set of information units being transmitted during a second set of the time intervals that includes fewer time intervals than the first set.

Another aspect relates to a wireless communications apparatus. The wireless communications apparatus can include a memory that retains instructions related to sending a set of information units over a first subband during a first set of time periods and sending the set of information units over a plurality of subbands that includes the first subband during a second set of the time periods, the second set includes fewer time periods than the first set. Moreover, the wireless communications apparatus can comprise a processor, coupled to the memory, configured to execute the instructions retained in the memory.

Yet another aspect relates to a wireless communications apparatus that enables supporting wideband and narrowband wireless communication devices. The wireless communications apparatus can include means for transferring a set of information units via a first subband during a first set of time intervals; and means for transferring the set of information units via a plurality of subbands, which includes the first subband, during a second set of the time intervals that includes fewer time intervals than the first set.

Still another aspect relates to a machine-readable medium having stored thereon machine-executable instructions for transmitting a set of information units via a first subband during a first set of time intervals, and transmitting the set of information units via a plurality of subbands, which includes the first subband, during a second set of the time intervals that includes a reduced number of time intervals in comparison to the first set.

In accordance with another aspect, an apparatus in a wireless communication system can include a processor, wherein the processor can be configured to transfer a set of information units for a narrowband wireless terminal via a first subband during a first set of time intervals. Further, the processor can be configured to transfer the set of information units for a wideband wireless terminal via a plurality of subbands, which includes the first subband, the set of information units being transferred during a reduced second set of the time intervals that includes fewer time intervals than the first set.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
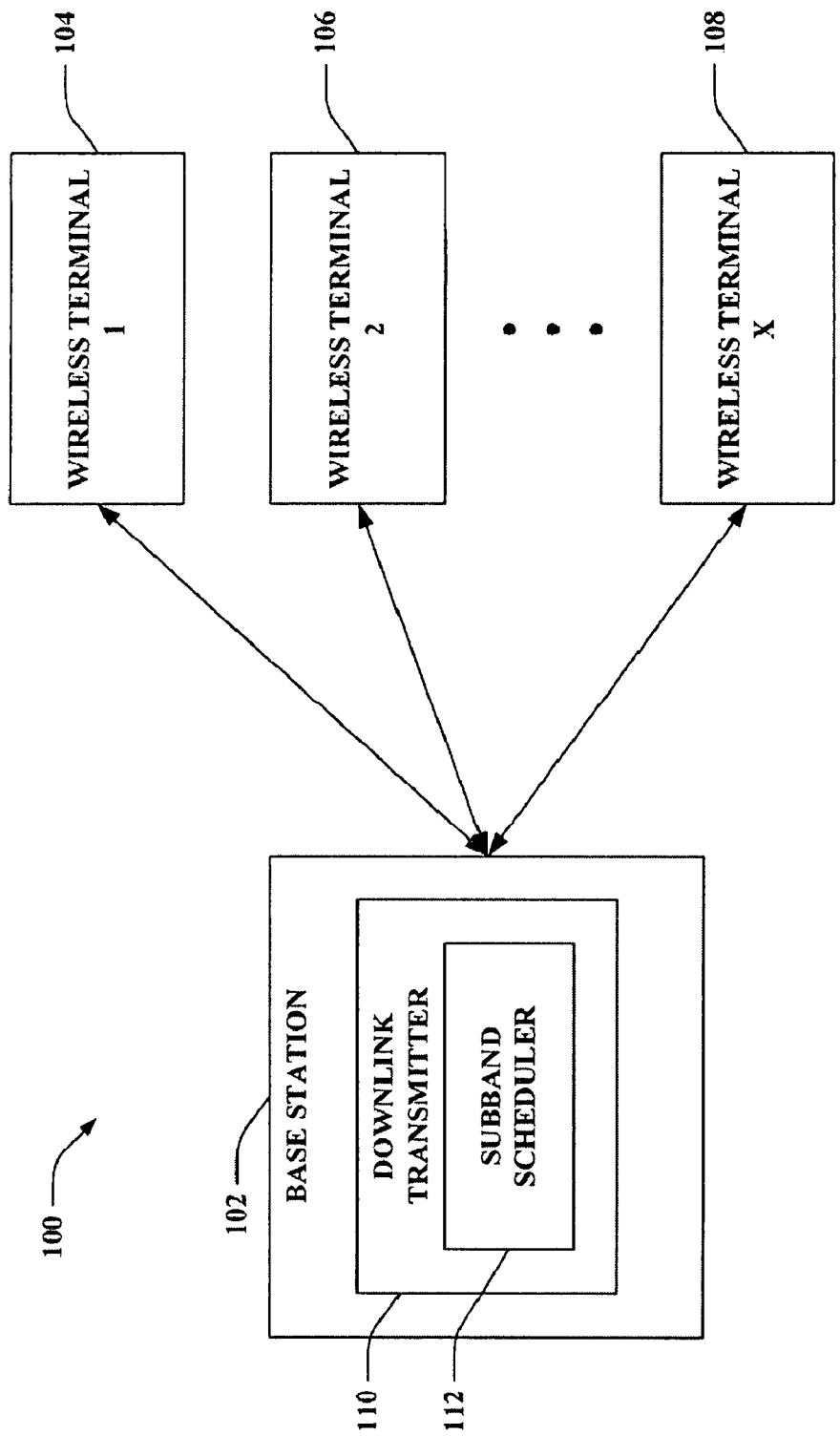
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 and one or more wireless terminals (e.g., wireless terminal 1 104, wireless terminal 2 106, . . . , wireless terminal X 108, where X can be substantially any integer). Although one base station (e.g., base station 102) is depicted, it is contemplated that system 100 can include substantially any number of base stations similar to base station 102. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with substantially any number of wireless terminals (e.g., wireless terminals 104-108). Wireless terminals 104-108 can be, for example, cellular phones, smart phones, laptops, handheld communication devices, handheld computing devices, satellite radios, global positioning systems, PDAs, and/or any other suitable device for communicating over wireless communication system 100. Wireless terminals 104-108 can receive information from base station 102 over a forward link (downlink) and/or transmit information to base station 102 over a reverse link (uplink). Further, system 100 can support both narrowband and wideband wireless terminals; thus, wireless terminals 104-108 can be wideband wireless terminals and/or narrowband wireless terminals. For example, wireless terminal 1 104 can be a wideband wireless terminal that can decode an entire frequency band utilized for transmission by base station 102 (e.g., all subbands within a set of subbands over which base station 102 transfers data), wireless terminal 2 106 can be a narrowband wireless terminal that can decode one subband from a set of subbands employed by base station 102, and wireless terminal X 108 can transition between narrowband and wideband operation (e.g., decode one subband or the entire set of subbands at a given time); however, the claimed subject matter is not limited to the aforementioned example.

Base station 102 further includes a downlink transmitter 110 that sends information to one or more of wireless terminals 104-108 over the downlink. For example, downlink transmitter 110 can enable base station 102 to transmit information via broadcast, multicast, unicast, etc. to a subset or all wireless terminals 104-108 within a geographic location. By way of further illustration, downlink transmitter 110 can leverage a 5 MHz frequency band for transmitting over the downlink; however, it is contemplated that substantially any size frequency band may be employed by downlink transmitter 110 to communicate with wireless terminal(s) 104-108.

Downlink transmitter 110 can further include a subband scheduler 112 that selects information for transmission over substantially any number of subbands within the frequency band employed by downlink transmitter 110 as a function of time. According to an example, a wideband 5 MHz wireless system can be divided into three subbands, each subband having an occupied bandwidth of 1.67 MHz; further, the subbands can be substantially similar to each other (e.g., each subband can carry substantially similar control channels). Although the example of a total of three subbands is described below for illustration purposes, it is to be appreciated that the frequency band can be divided into more or less than three subbands. Subband scheduler 112 can control information transmitted on each of the three subbands during each time period. Thus, subband scheduler 112 can schedule information transmission on each of the subbands in a manner that enhances wideband operation while supporting narrowband functionality. Further, although not depicted, it is contemplated that each subband can be associated with a respective subband scheduler similar to subband scheduler 112.

Subband scheduler 112 can enable controlling transfer of various types of information over the downlink. For example, the information can be control data (e.g., overhead data) utilized by wireless terminals 104-108 for access (e.g., acquisition, handoff, . . . ) related to base station 102 (e.g., thereafter unicast messages can be communicated, . . . ). According to another illustration, the information can relate to loading associated with a cell in general and/or subband(s) related to the cell in particular, where the loading information can be employed by wireless terminals 104-108 to identify a state of the cell and/or the subband(s). Further to this illustration, wireless terminals 104-108 can effectuate adjustments based upon the loading information. Moreover, a wideband wireless terminal can perform load balancing associated with each of the subbands to select a particular subband (e.g., for additional communication of data). By way of another example, subband scheduler 112 can allow for transmitting information related to broadcast and/or multicast services (e.g., sending video content over the downlink, . . . ).

One or more of wireless terminals 104-108 can be wideband-capable; thus, such wideband-capable wireless terminals (e.g., wideband wireless terminals) can process all subbands within the set of subbands employed for downlink transmission by base station 102 (e.g., all three subbands). Further, one or more wireless terminals 104-108 can be narrowband-capable (e.g., narrowband wireless terminals), and therefore, can process one subband. For instance, a narrowband wireless terminal can obtain traffic in one of the subbands; hence, traffic carried by the other subband(s) need not be processed by this wireless terminal. Since narrowband wireless terminals typically employ less processing power, such devices can be cheaper and more power efficient, albeit with lower peak performance capabilities. Wideband wireless terminals, on the other hand, can afford higher peak performance on the same system, albeit at higher cost and with less power efficiency.

Base station 102 can broadcast information in the downlink to wireless terminals 104-108 (e.g., via downlink transmitter 110). Pursuant to an example, wideband and narrowband wireless terminals can both be supported by repeating the information being broadcast in each of the subbands. Thus, subband scheduler 112 can enable broadcasting common information in each subband during a particular time interval. According to another illustration, subband scheduler 112 can stagger times for common information to be transmitted via differing subbands to enhance performance of wideband wireless terminals while continuing to support narrowband wireless terminals. Pursuant to this illustration, subband scheduler 112 can split information to be sent by downlink transmitter 110 over the downlink into distinct portions (e.g., information units). Moreover, subband scheduler 112 can enable downlink transmission whereby substantially similar information units are scheduled for transfer during differing time intervals as not to be repeated concurrently in each of the subbands.

Figure 2:
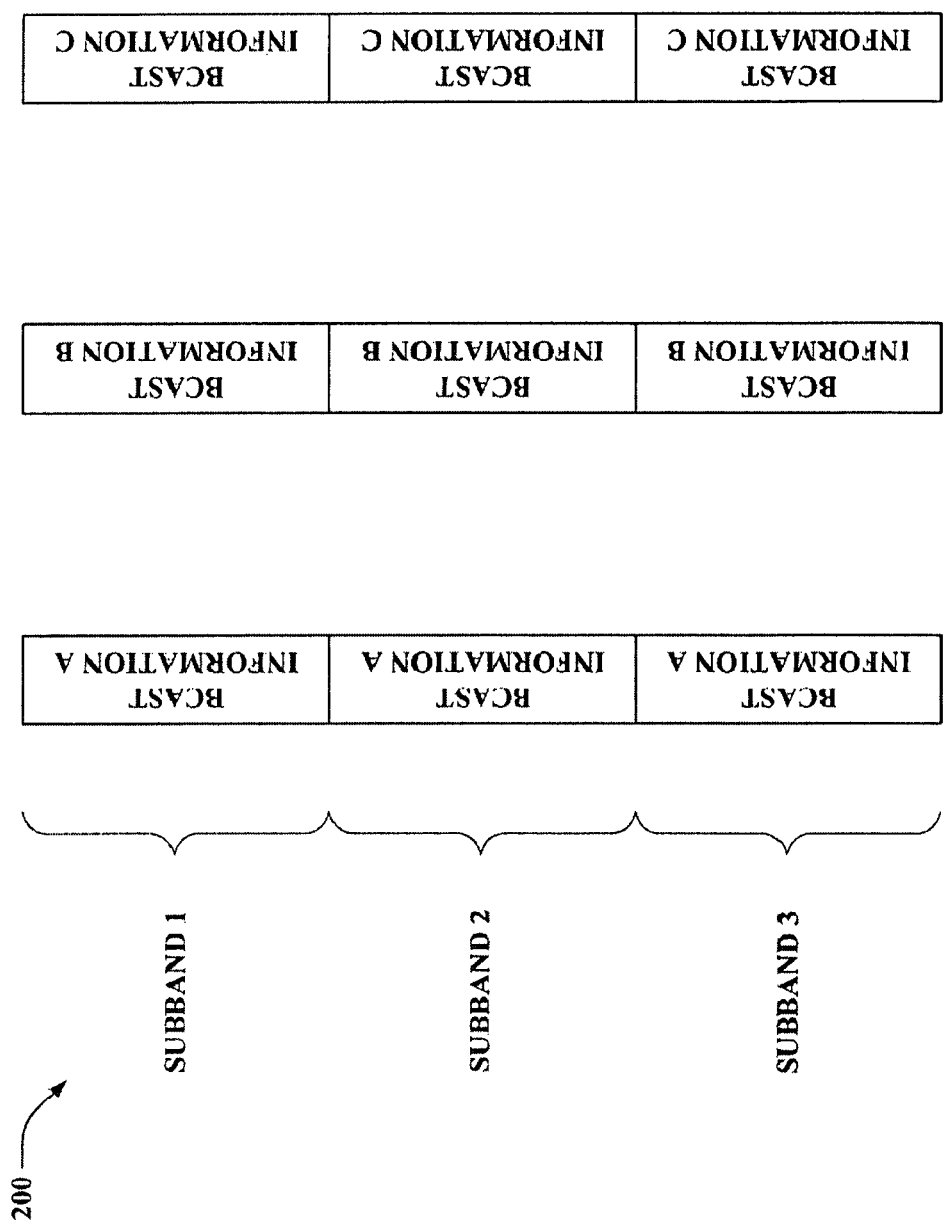
FIG. 2 is an illustration of an example scheme for broadcasting information in a system that supports both narrowband and wideband communication.

Turning to FIG. 2, illustrated is an example scheme 200 for broadcasting information in a system that supports both narrowband and wideband communication. As shown, the wideband system can be divided into three subbands (e.g., subband 1, subband 2, and subband 3); however, it is contemplated that substantially any number of subbands can be utilized. Each of the subbands can include a broadcast channel. Further, each of the broadcast channels can carry one unit of information during a time interval. Pursuant to an illustration, three units of information (e.g., A, B, and C) can be broadcast from a base station (e.g., base station 102 of FIG. 1) to wireless terminal(s) (e.g., wireless terminal(s) 104-108 of FIG. 1); however, it is contemplated that substantially any number of information units can be broadcast. For instance, information A can be transmitted on the broadcast channel in each of the subbands at time N, information B can be sent on each of the subbands at time N+K, and information C can be transferred on each of the subbands at time N+2K. Narrowband wireless terminals can process one subband during a time unit; thus, the three units of information being broadcast can be received by narrowband wireless terminals in three time units in this example.

According to the example scheme 200, wideband wireless terminals can receive the three units of information in the same amount of time as narrowband wireless terminals. However, wideband wireless terminals can decode all subbands at a time. Thus, by employing the approach shown in scheme 200 whereby common information is repeated in each of the three subbands during each time period, performance of wideband wireless terminals can fail to be improved in comparison to narrowband wireless terminals because both types of devices can obtain the three units of broadcast information over an equal amount of time (e.g., three time units).

Figure 3:
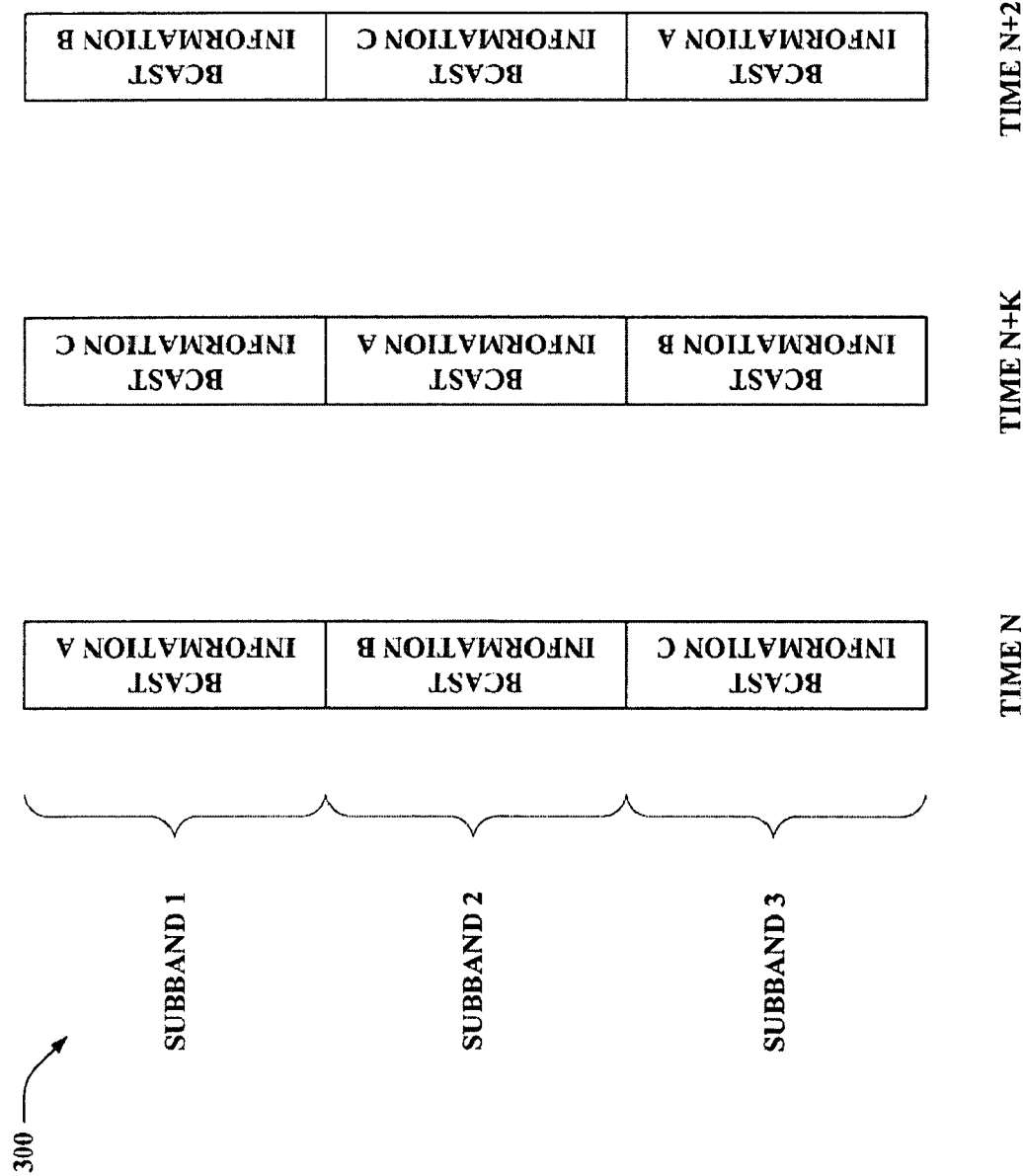
FIG. 3 is an illustration of another example scheme for broadcasting information.

Now referring to FIG. 3, illustrated is another example scheme 300 for broadcasting information. Scheme 300 includes three subbands (e.g., subband 1, subband 2, and subband 3); however, it is contemplated that more or less than three subbands can be employed. According to the example shown, a base station can broadcast three information units A, B, and C over the downlink (e.g., information to be broadcast can be split into three information units). Further, a subband scheduler (e.g., subband scheduler 112 of FIG. 1) can control transmission times for the information units over each of the subbands. Utilization of the approach shown in scheme 300 can provide improved performance to wideband wireless terminals. In particular, wideband wireless terminals, by virtue of being able to process all the subbands at a time, can receive the three broadcast information units (e.g., information units A, B, and C) in a lesser amount of time in comparison to narrowband wireless terminals (e.g., in one unit of time in scheme 300). The three information units can be staggered such that the information units are scheduled without repetition in the three subbands during a particular time interval. Narrowband wireless terminals, on the other hand, can receive the three units of broadcast information over three time units; thus, all three information units can be obtained over a sufficient amount of time on any of the three subbands as shown in scheme 300. Narrowband wireless terminals can decode any one of the subbands to yield the three information units. Accordingly, wideband wireless terminals can experience better performance as compared to narrowband wireless terminals (e.g., since wideband wireless terminals can obtain information in a lesser amount of time).

According to another example (not depicted), twelve information units can be transmitted employing an approach similar to that depicted in scheme 300. Each subband can transmit the twelve information units over twelve time slots (e.g., one information unit in each of the time slots); thus, narrowband wireless terminals can decode any one of the subbands to obtain all twelve information units over twelve time slots. Further, transmission can be staggered between subbands to avoid concurrent transmission of a common information unit over more than one subband during one time slot. Moreover, a schedule can be utilized whereby each of the twelve information units are transferred upon one of the subbands during one time slot within four adjoining time slots across the three subbands; accordingly, a wideband wireless terminal can obtain the twelve information units during the four time slots. Pursuant to another illustration, a subset of the twelve information units can be of high importance (e.g., can be utilized for pre-rendering at the receiver, . . . ); thus, the subset of information units can be transmitted more often than the remainder of the twelve information units. By way of a further example, narrowband wireless terminals can jump between differing subbands to decode. According to this example, metadata can be obtained by narrowband wireless terminals that can be leveraged to switch between subbands and/or to identify a subband for decoding (e.g., to optimize narrowband performance). It is contemplated, for instance, that the order of receipt of information units can be irrelevant (e.g., utilization of the information units can begin upon obtaining a set of information units) and/or relevant (e.g., certain information unit(s) from a set of information units can be utilized for pre-rendering).

Figure 4:
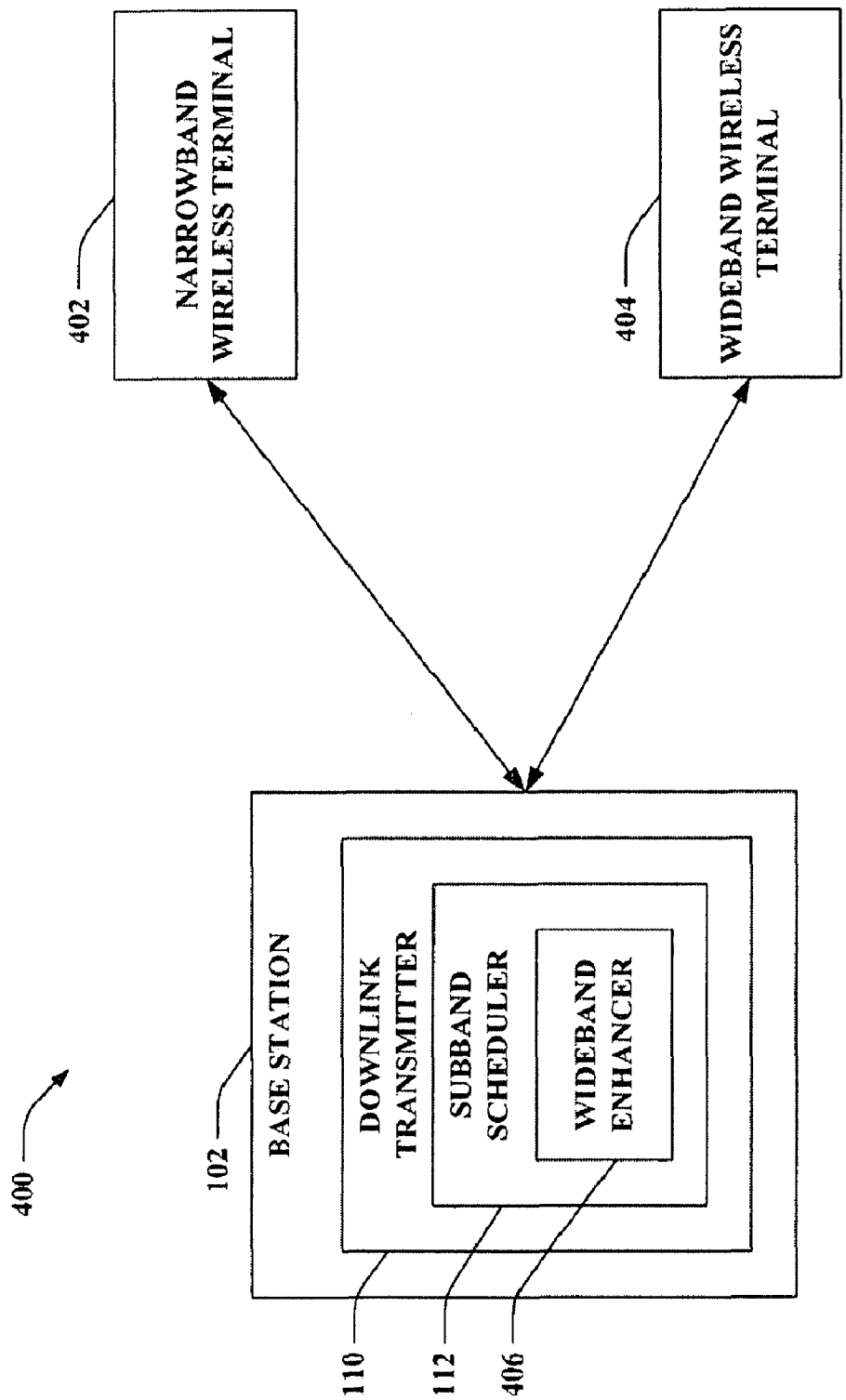
FIG. 4 is an illustration of an example system that supports wideband and narrowband wireless communication.

With reference to FIG. 4, illustrated is a system 400 that supports wideband and narrowband wireless communication. System 400 includes base station 102 that communicates with narrowband wireless terminal 402 and/or wideband wireless terminal 404. It is contemplated that system 400 can include any number of narrowband wireless terminals similar to narrowband wireless terminal 402 and any number of wideband wireless terminals similar to wideband wireless terminal 404. According to an illustration, narrowband wireless terminal 402 can be a wireless terminal that only operates in a narrow portion of the frequency band supported by base station 102 and/or a device that chooses to operate in a narrow portion of the band (e.g., a device that can also support wideband operation).

Base station 102 can comprise downlink transmitter 110 that enables sending information via the downlink to narrowband wireless terminal 402 and/or wideband wireless terminal 404. Downlink transmitter 110 can leverage subband scheduler 112 to control transmission over a plurality of subbands utilized by downlink transmitter 110 for communication with narrowband wireless terminal 402 and/or wideband wireless terminal 404. For example, subband scheduler 112 can allocate an information unit to be transferred over a first subband at a first time and a second subband at a second time. Further, overall scheduling across all subbands yielded by subband scheduler 112 can enable supporting operation of narrowband wireless terminal 402 while enhancing performance of wideband wireless terminal 404. For instance, wideband wireless terminal 404 can obtain information sent over the downlink faster than narrowband wireless terminal 402; thus, wideband wireless terminal 404 can enable handing off to base station 102 faster, utilizing content from base station 102 quicker, and the like.

Subband scheduler 112 can further include wideband enhancer 406 that can provide additional information for wideband wireless terminal 404. For example, broadcast information for both narrowband wireless terminal 402 and wideband wireless terminal 404 can be transmitted over a subset of the subbands (e.g., one subband) at all times. Further, the remaining subbands can be employed to transmit such broadcast information to wideband wireless terminal 404 during a subset of the time intervals. During the other time intervals, the remaining subbands can be utilized to provide additional content to wideband wireless terminal 404. Additionally or alternatively, transmission need not occur during such other time intervals over the remaining subbands. Thus, wideband enhancer 406 can mitigate repetition of information obtained by wideband wireless terminal 404; rather, supplementary information can be transmitted to augment performance of wideband wireless terminal 404 and/or interference between cells can be mitigated by inhibiting broadcast transmission during a portion of the time intervals over some of the subbands.

Figure 5:
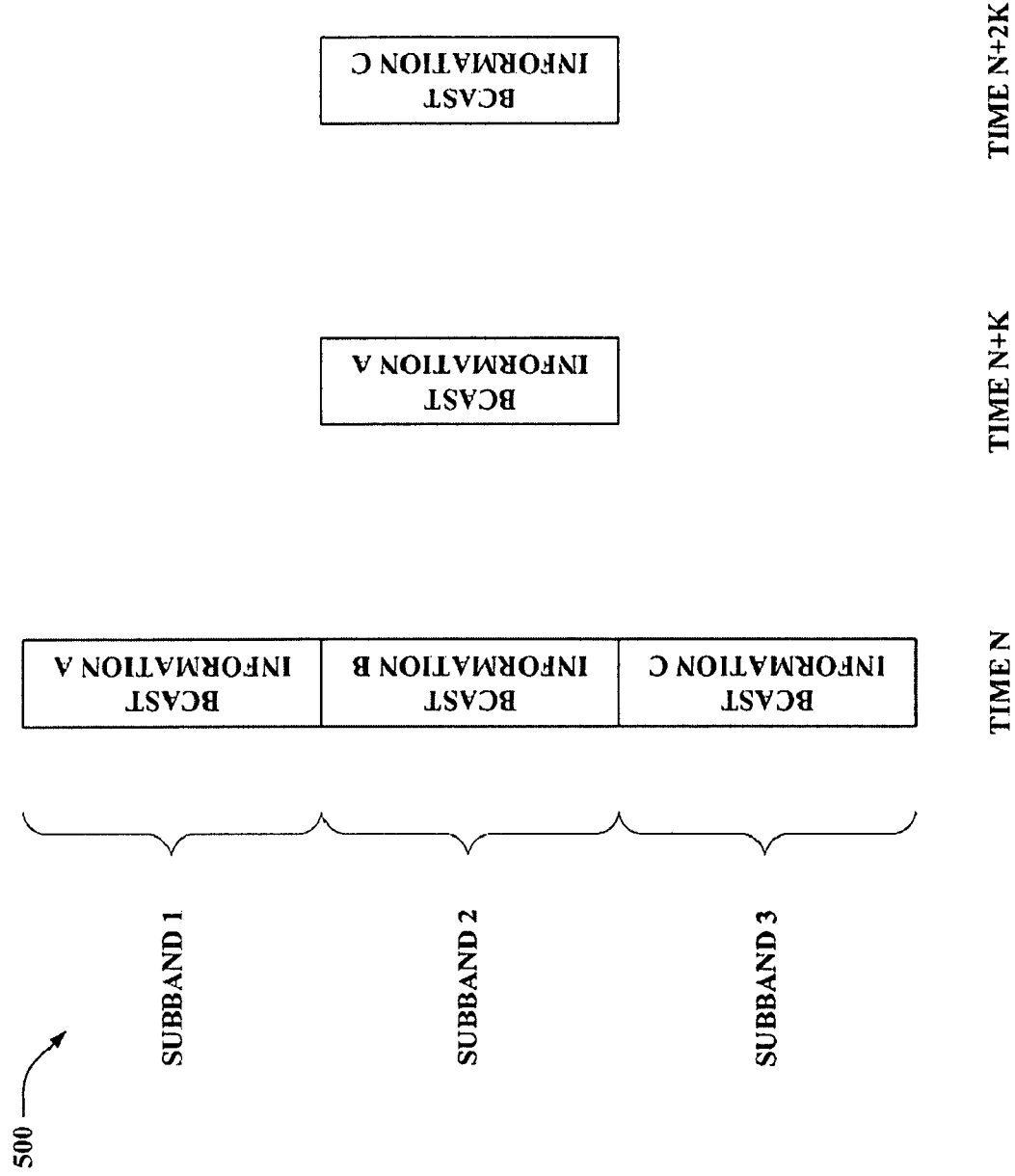
FIG. 5 is an illustration of an example scheme for supporting wideband and narrowband communication that mitigates interference between cells.

Now turning to FIG. 5, illustrated is an example scheme 500 for supporting wideband and narrowband communication that mitigates interference between cells. Three subbands are illustrated in scheme 500 for communicating three units of information (e.g., information units A, B, and C); however, it is contemplated that any number of subbands can be utilized for transferring any number of information units. By employing the example approach depicted in scheme 500, narrowband wireless terminals can decode subband 2 to obtain the three units of information. Further, wideband wireless terminals can process the three subbands at time N to obtain the three information units. Meanwhile, the base station need not transmit on subbands 1 and 3 during times N+K and N+2K. Accordingly, narrowband and wideband wireless terminals can experience performance comparable with the approach depicted in FIG. 3 (e.g., assuming that wideband wireless terminals decode beginning at time N otherwise if the wideband wireless terminal arrives slightly after time N it can wait for almost 3K to obtain all broadcast information rather than a delay of K due to late arrival when utilizing the approach of FIG. 3). Moreover, the approach in scheme 500 reduces utilization of the broadcast channel, which thereby mitigates interference caused to other cells. By way of another example, disparate complementary information (e.g., information units other than A, B, and C, unessential yet useful information, . . . ) intended for wideband wireless terminals can be sent over subbands 1 and 3 during times N+K and N+2K. The complementary information can provide a richer, faster, etc. experience for wideband wireless terminals (e.g., higher resolution related information, high definition related information, . . . ).

Figure 6:
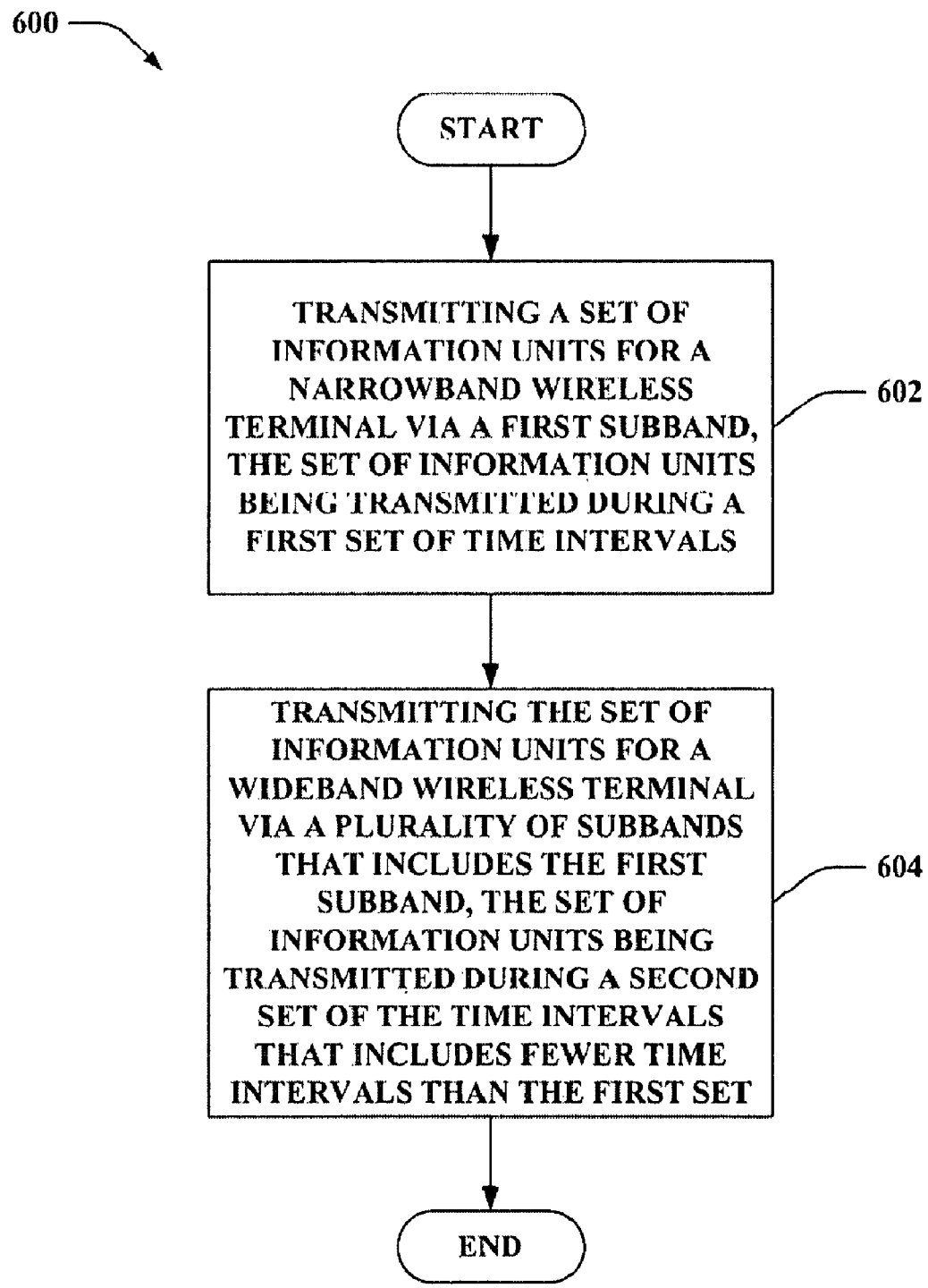
FIG. 6 is an illustration of an example methodology that facilitates communicating information to narrowband and wideband devices in a wideband wireless environment.
Figure 7:
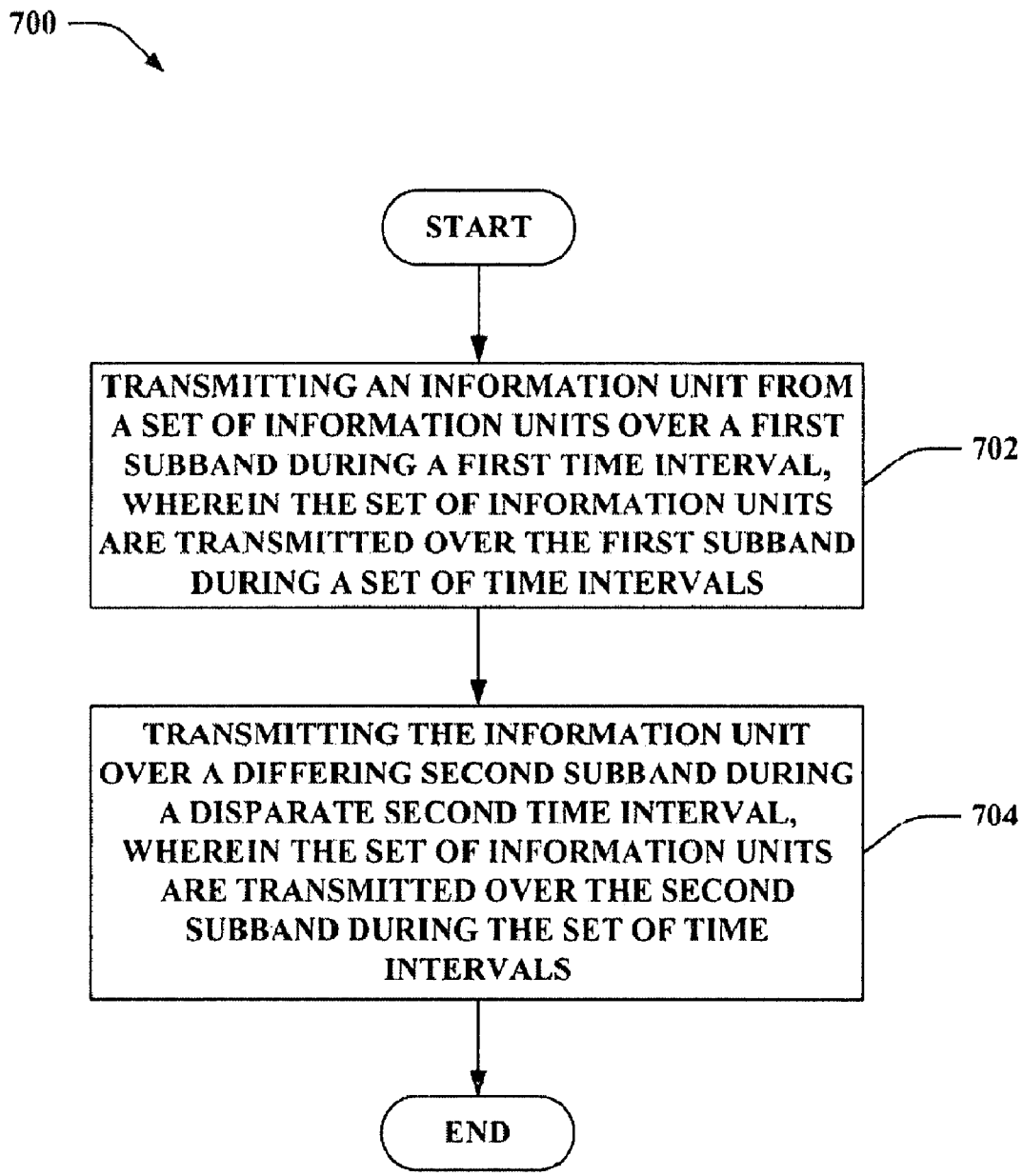
FIG. 7 is an illustration of an example methodology that facilitates staggering transfer of information units over differing subbands to enhance wideband performance in an environment that supports narrowband and wideband devices.

Referring to FIGS. 6-7, methodologies relating to transferring information to narrowband and wideband devices in a wideband wireless environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 6, illustrated is a methodology 600 that facilitates communicating information to narrowband and wideband devices in a wideband wireless environment. At 602, a set of information units for a narrowband wireless terminal can be transmitted via a first subband, where the set of information units can be transmitted during a first set of time intervals. For example, the set of information units can be transferred by way of broadcast, multicast, unicast, etc. Moreover, any number of information units can be included in the set that can be sent over the downlink. Further, each information unit can be transmitted during a respective time interval over the first subband. At 604, the set of information units can be transmitted for a wideband wireless terminal via a plurality of subbands that includes the first subband, where the set of information units can be transmitted during a second set of the time intervals that includes fewer time intervals than the first set. Thus, the set of information units can be transferred over the downlink upon a plurality of subbands during a lesser amount of time as compared to the amount of time for transmitting the set of information units upon one of the subbands. For example, transmission of a common information unit can be staggered in time across disparate subbands. Additionally or alternatively, the first subband can be utilized to communicate the set of information units to narrowband device(s), while disparate subbands in the set of subbands can provide the information units during a portion of the time intervals while inhibiting transmission during the remaining times and/or transferring complementary data other than the information units during such remaining times.

Turning now to FIG. 7, illustrated is a methodology 700 that facilitates staggering transfer of information units over differing subbands to enhance wideband performance in an environment that supports narrowband and wideband devices. At 702, an information unit from a set of information units can be transmitted over a first subband during a first time interval. The set of information units can be transmitted over the first subband during a set of time intervals. At 704, the information unit can be transmitted over a differing second subband during a disparate second time interval. Further, the set of information units can be transmitted over the second subband during the set of time intervals. By way of example (as depicted in FIG. 3), three information units can be transferred over a downlink upon three subbands. Accordingly, the three information units can be sent over a particular subband during three time intervals. Further, the three information units can be staggered in a differing subband such that concurrent transmission of a common information unit over more than one subband can be mitigated. Thus, a narrowband device can obtain the set of information units by decoding one of the subbands, while a wideband device can decode the set of subbands to obtain the set of information units in a lesser time period.

It will be appreciated that, in accordance with one or more aspects described herein, inferences can be made regarding optimizing performance within an environment that supports wideband and narrowband devices. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting whether to indicate to a narrowband device to switch from a first subband to a second subband for decoding during narrowband operation. In accordance with another example, an inference can be made related to determining whether to provide complimentary information or inhibit transmission over a subset of the subbands during a portion of the time intervals. It will be appreciated that the foregoing examples are illustrative in nature and are not intended to limit the number of inferences that can be made or the manner in which such inferences are made in conjunction with the various embodiments and/or methods described herein.

Figure 8:
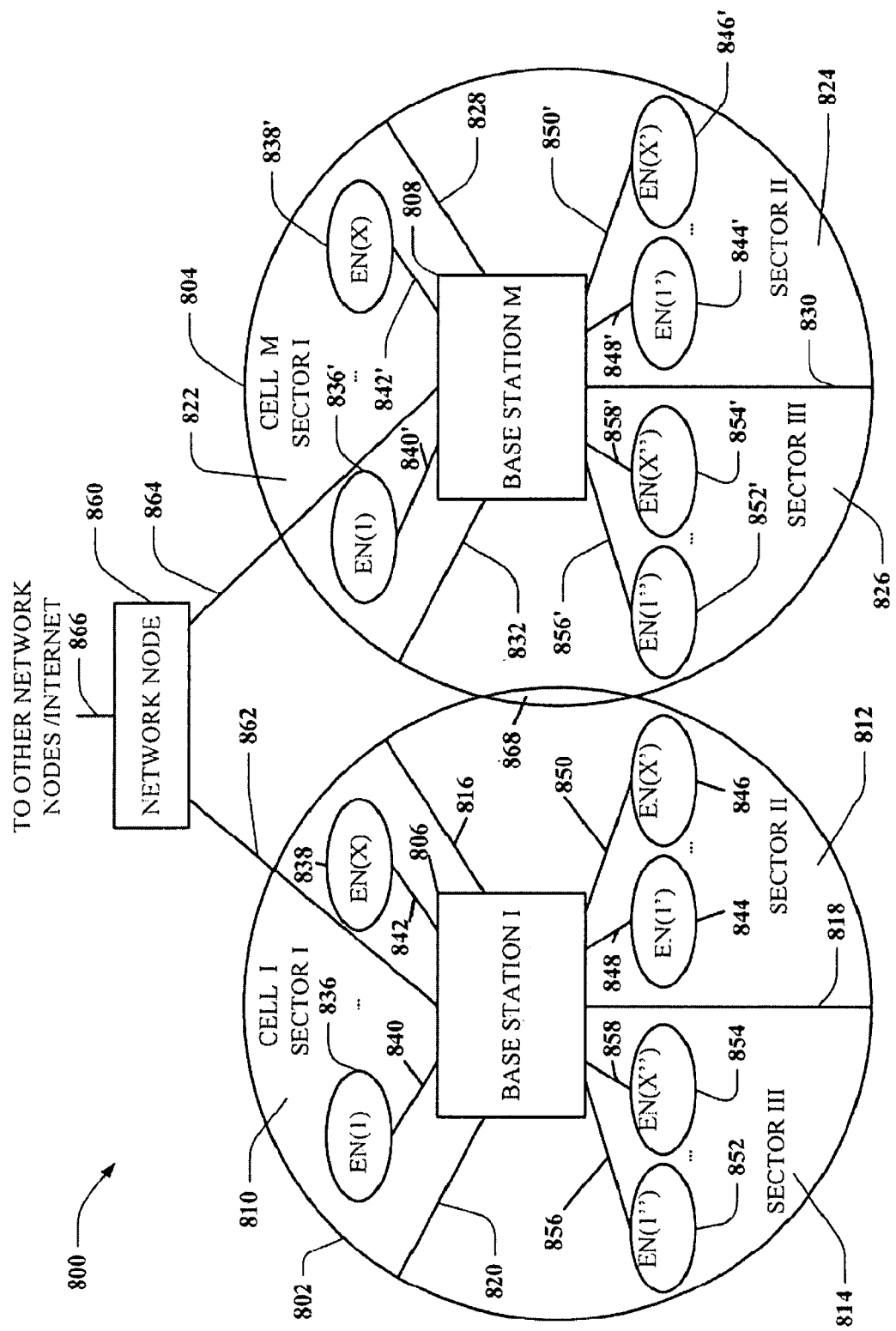
FIG. 8 is an illustration of an example communication system implemented in accordance with various aspects including multiple cells.

FIG. 8 depicts an example communication system 800 implemented in accordance with various aspects including multiple cells: cell I 802, cell M 804. Note that neighboring cells 802, 804 overlap slightly, as indicated by cell boundary region 868, thereby creating potential for signal interference between signals transmitted by base stations in neighboring cells. Each cell 802, 804 of system 800 includes three sectors. Cells which have not be subdivided into multiple sectors (N=1), cells with two sectors (N=2) and cells with more than 3 sectors (N>3) are also possible in accordance with various aspects. Cell 802 includes a first sector, sector I 810, a second sector, sector II 812, and a third sector, sector III 814. Each sector 810, 812, 814 has two sector boundary regions; each boundary region is shared between two adjacent sectors.

Sector boundary regions provide potential for signal interference between signals transmitted by base stations in neighboring sectors. Line 816 represents a sector boundary region between sector I 810 and sector II 812; line 818 represents a sector boundary region between sector II 812 and sector III 814; line 820 represents a sector boundary region between sector III 814 and sector I 810. Similarly, cell M 804 includes a first sector, sector I 822, a second sector, sector II 824, and a third sector, sector III 826. Line 828 represents a sector boundary region between sector I 822 and sector II 824; line 830 represents a sector boundary region between sector II 824 and sector III 826; line 832 represents a boundary region between sector III 826 and sector I 822. Cell I 802 includes a base station (BS), base station I 806, and a plurality of end nodes (ENs) (e.g., wireless terminals) in each sector 810, 812, 814. Sector I 810 includes EN(1) 836 and EN(X) 838 coupled to BS 806 via wireless links 840, 842, respectively; sector II 812 includes EN(1') 844 and EN(X') 846 coupled to BS 806 via wireless links 848, 850, respectively; sector III 814 includes EN(1") 852 and EN(X") 854 coupled to BS 806 via wireless links 856, 858, respectively. Similarly, cell M 804 includes base station M 808, and a plurality of end nodes (ENs) in each sector 822, 824, 826. Sector I 822 includes EN(1) 836' and EN(X) 838' coupled to BS M 808 via wireless links 840', 842', respectively; sector II 824 includes EN(1') 844' and EN(X') 846' coupled to BS M 808 via wireless links 848', 850', respectively; sector 3 826 includes EN(1") 852' and EN(X") 854' coupled to BS 808 via wireless links 856', 858', respectively.

System 800 also includes a network node 860 which is coupled to BS I 806 and BS M 808 via network links 862, 864, respectively. Network node 860 is also coupled to other network nodes, e.g., other base stations, AAA server nodes, intermediate nodes, routers, etc. and the Internet via network link 866. Network links 862, 864, 866 may be, e.g., fiber optic cables. Each end node, e.g., EN(1) 836 may be a wireless terminal including a transmitter as well as a receiver. The wireless terminals, e.g., EN(1) 836 may move through system 800 and may communicate via wireless links with the base station in the cell in which the EN is currently located. The wireless terminals, (WTs), e.g., EN(1) 836, may communicate with peer nodes, e.g., other WTs in system 800 or outside system 800 via a base station, e.g., BS 806, and/or network node 860. WTs, e.g., EN(1) 836 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones.

Figure 9:
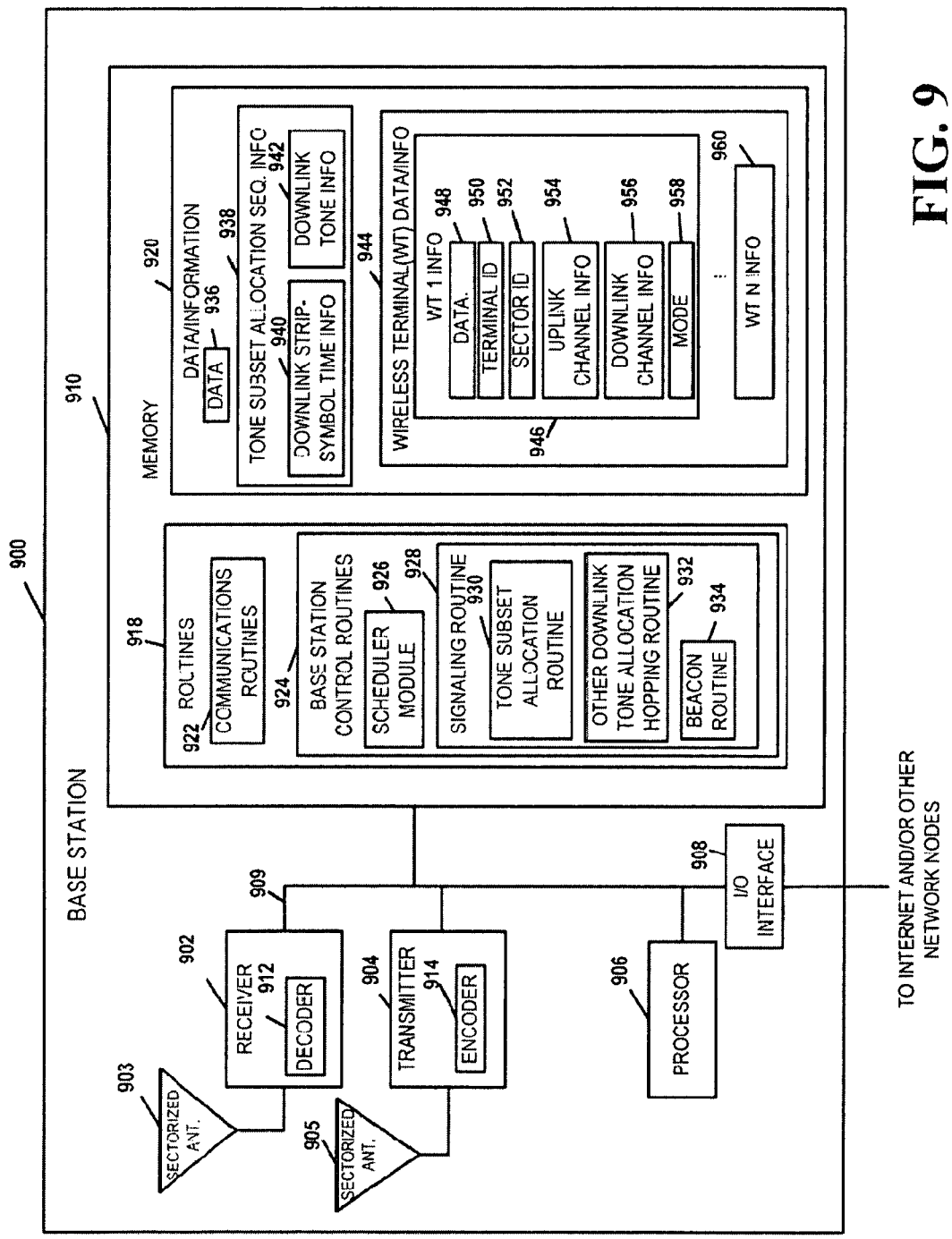
FIG. 9 is an illustration of an example base station in accordance with various aspects.

FIG. 9 illustrates an example base station 900 in accordance with various aspects. Base station 900 implements tone subset allocation sequences, with different tone subset allocation sequences generated for respective different sector types of the cell. Base station 900 may be used as any one of base stations 806, 808 of the system 800 of FIG. 8. The base station 900 includes a receiver 902, a transmitter 904, a processor 906, e.g., CPU, an input/output interface 908 and memory 910 coupled together by a bus 909 over which various elements 902, 904, 906, 908, and 910 may interchange data and information.

Sectorized antenna 903 coupled to receiver 902 is used for receiving data and other signals, e.g., channel reports, from wireless terminals transmissions from each sector within the base station's cell. Sectorized antenna 905 coupled to transmitter 904 is used for transmitting data and other signals, e.g., control signals, pilot signal, beacon signals, etc. to wireless terminals 1000 (see FIG. 10) within each sector of the base station's cell. In various aspects, base station 900 may employ multiple receivers 902 and multiple transmitters 904, e.g., an individual receiver 902 for each sector and an individual transmitter 904 for each sector. Processor 906 may be, e.g., a general purpose central processing unit (CPU). Processor 906 controls operation of base station 900 under direction of one or more routines 918 stored in memory 910 and implements the methods. I/O interface 908 provides a connection to other network nodes, coupling the BS 900 to other base stations, access routers, AAA server nodes, etc., other networks, and the Internet. Memory 910 includes routines 918 and data/information 920.

Data/information 920 includes data 936, tone subset allocation sequence information 938 including downlink strip-symbol time information 940 and downlink tone information 942, and wireless terminal (WT) data/info 944 including a plurality of sets of WT information: WT1 info 946 and WT N info 960. Each set of WT info, e.g., WT1 info 946 includes data 948, terminal ID 950, sector ID 952, uplink channel information 954, downlink channel information 956, and mode information 958.

Routines 918 include communications routines 922 and base station control routines 924. Base station control routines 924 includes a scheduler module 926 and signaling routines 928 including a tone subset allocation routine 930 for strip-symbol periods, other downlink tone allocation hopping routine 932 for the rest of symbol periods, e.g., non strip-symbol periods, and a beacon routine 934.

Data 936 includes data to be transmitted that will be sent to encoder 914 of transmitter 904 for encoding prior to transmission to WTs, and received data from WTs that has been processed through decoder 912 of receiver 902 following reception. Downlink strip-symbol time information 940 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 942 includes information including a carrier frequency assigned to the base station 900, the number and frequency of tones, and the set of tone subsets to be allocated to the strip-symbol periods, and other cell and sector specific values such as slope, slope index and sector type.

Data 948 may include data that WT1 1000 has received from a peer node, data that WT1 1000 desires to be transmitted to a peer node, and downlink channel quality report feedback information. Terminal ID 950 is a base station 900 assigned ID that identifies WT1 1000. Sector ID 952 includes information identifying the sector in which WT1 1000 is operating. Sector ID 952 can be used, for example, to determine the sector type. Uplink channel information 954 includes information identifying channel segments that have been allocated by scheduler 926 for WT1 1000 to use, e.g., uplink traffic channel segments for data, dedicated uplink control channels for requests, power control, timing control, etc. Each uplink channel assigned to WT1 1000 includes one or more logical tones, each logical tone following an uplink hopping sequence. Downlink channel information 956 includes information identifying channel segments that have been allocated by scheduler 926 to carry data and/or information to WT1 1000, e.g., downlink traffic channel segments for user data. Each downlink channel assigned to WT1 1000 includes one or more logical tones, each following a downlink hopping sequence. Mode information 958 includes information identifying the state of operation of WT1 1000, e.g. sleep, hold, on.

Communications routines 922 control the base station 900 to perform various communications operations and implement various communications protocols. Base station control routines 924 are used to control the base station 900 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 928 controls the operation of receiver 902 with its decoder 912 and transmitter 904 with its encoder 914. The signaling routine 928 is responsible for controlling the generation of transmitted data 936 and control information. Tone subset allocation routine 930 constructs the tone subset to be used in a strip-symbol period using the method of the aspect and using data/information 920 including downlink strip-symbol time info 940 and sector ID 952. The downlink tone subset allocation sequences will be different for each sector type in a cell and different for adjacent cells. The WTs 1000 receive the signals in the strip-symbol periods in accordance with the downlink tone subset allocation sequences; the base station 900 uses the same downlink tone subset allocation sequences in order to generate the transmitted signals. Other downlink tone allocation hopping routine 932 constructs downlink tone hopping sequences, using information including downlink tone information 942, and downlink channel information 956, for the symbol periods other than the strip-symbol periods. The downlink data tone hopping sequences are synchronized across the sectors of a cell. Beacon routine 934 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 10:
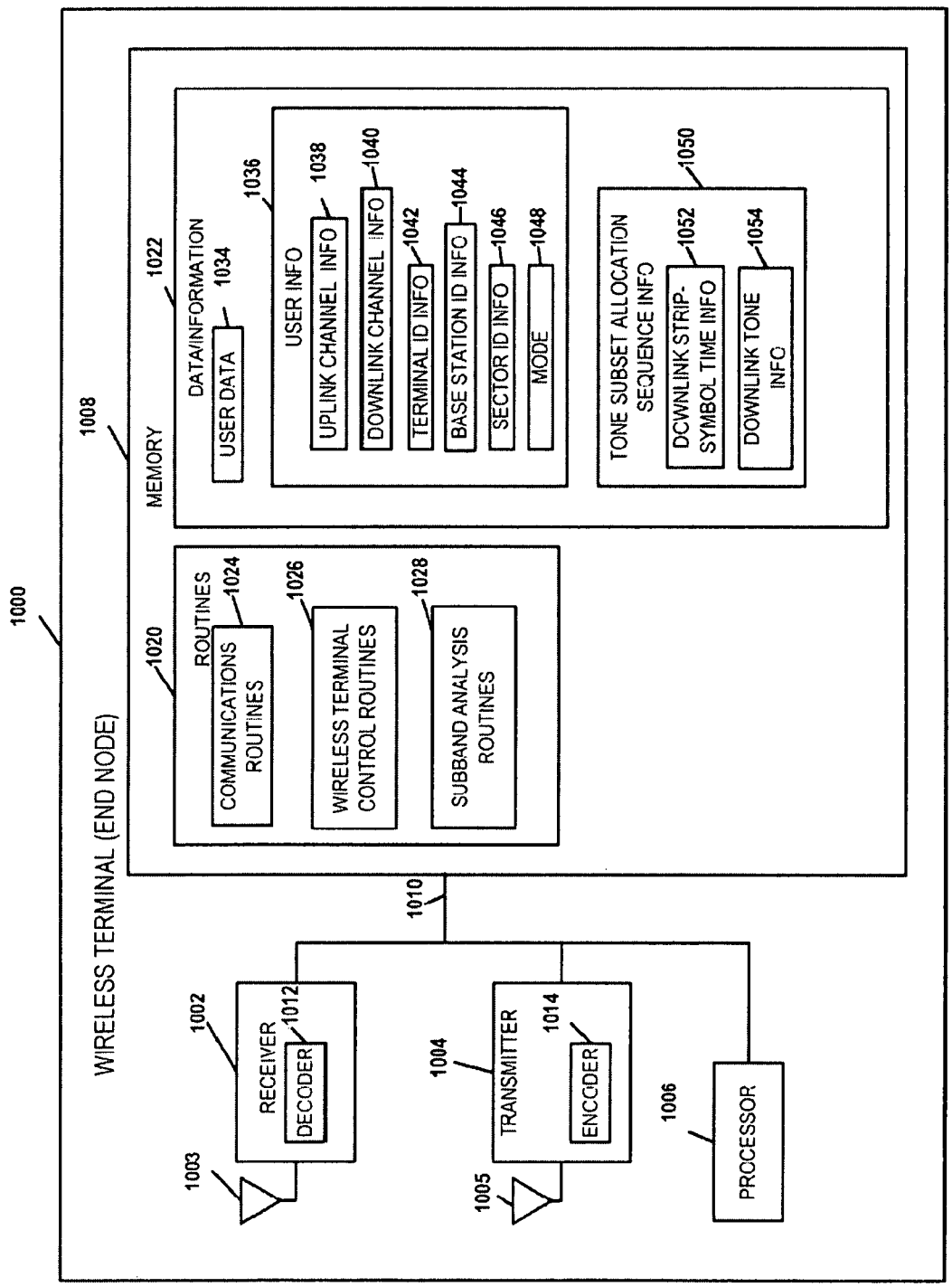
FIG. 10 is an illustration of an example wireless terminal (e.g., mobile device, end node, . . . ) implemented in accordance with various aspects described herein.

FIG. 10 illustrates an example wireless terminal (e.g., end node, mobile device, . . . ) 1000 which can be used as any one of the wireless terminals (e.g., end nodes, mobile devices, . . . ), e.g., EN(1) 836, of the system 800 shown in FIG. 8. Wireless terminal 1000 implements the tone subset allocation sequences. Wireless terminal 1000 includes a receiver 1002 including a decoder 1012, a transmitter 1004 including an encoder 1014, a processor 1006, and memory 1008 which are coupled together by a bus 1010 over which the various elements 1002, 1004, 1006, 1008 can interchange data and information. An antenna 1003 used for receiving signals from a base station 900 (and/or a disparate wireless terminal) is coupled to receiver 1002. An antenna 1005 used for transmitting signals, e.g., to base station 900 (and/or a disparate wireless terminal) is coupled to transmitter 1004.

The processor 1006 (e.g., a CPU) controls operation of wireless terminal 1000 and implements methods by executing routines 1020 and using data/information 1022 in memory 1008.

Data/information 1022 includes user data 1034, user information 1036, and tone subset allocation sequence information 1050. User data 1034 may include data, intended for a peer node, which will be routed to encoder 1014 for encoding prior to transmission by transmitter 1004 to base station 900, and data received from the base station 900 which has been processed by the decoder 1012 in receiver 1002. User information 1036 includes uplink channel information 1038, downlink channel information 1040, terminal ID information 1042, base station ID information 1044, sector ID information 1046, and mode information 1048. Uplink channel information 1038 includes information identifying uplink channels segments that have been assigned by base station 900 for wireless terminal 1000 to use when transmitting to the base station 900. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1040 includes information identifying downlink channel segments that have been assigned by base station 900 to WT 1000 for use when BS 900 is transmitting data/information to WT 1000. Downlink channels may include downlink traffic channels and assignment channels, each downlink channel including one or more logical tone, each logical tone following a downlink hopping sequence, which is synchronized between each sector of the cell.

User info 1036 also includes terminal ID information 1042, which is a base station 900 assigned identification, base station ID information 1044 which identifies the specific base station 900 that WT has established communications with, and sector ID info 1046 which identifies the specific sector of the cell where WT 1000 is presently located. Base station ID 1044 provides a cell slope value and sector ID info 1046 provides a sector index type; the cell slope value and sector index type may be used to derive tone hopping sequences. Mode information 1048 also included in user info 1036 identifies whether the WT 1000 is in sleep mode, hold mode, or on mode.

Tone subset allocation sequence information 1050 includes downlink strip-symbol time information 1052 and downlink tone information 1054. Downlink strip-symbol time information 1052 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1054 includes information including a carrier frequency assigned to the base station 900, the number and frequency of tones, and the set of tone subsets to be allocated to the strip-symbol periods, and other cell and sector specific values such as slope, slope index and sector type.

Routines 1020 include communications routines 1024, wireless terminal control routines 1026, and subband analysis routines 1028. Communications routines 1024 control the various communications protocols used by WT 1000. By way of example, communications routines 1024 may enable receiving a broadcast signal (e.g., from base station 900). Wireless terminal control routines 1026 control basic wireless terminal 1000 functionality including the control of the receiver 1002 and transmitter 1004. Subband analysis routines 1028 control evaluating one or more subbands within a wireless communications environment to yield information transferred over the downlink. For example, if wireless terminal 1000 is a narrowband device, subband analysis routines 1028 can enable decoding one subband during a particular time interval. Further, if wireless terminal 1000 is a wideband device, subband analysis routines 1028 can facilitate concurrent decoding a plurality of subbands to obtain information sent over the downlink.

Figure 11:
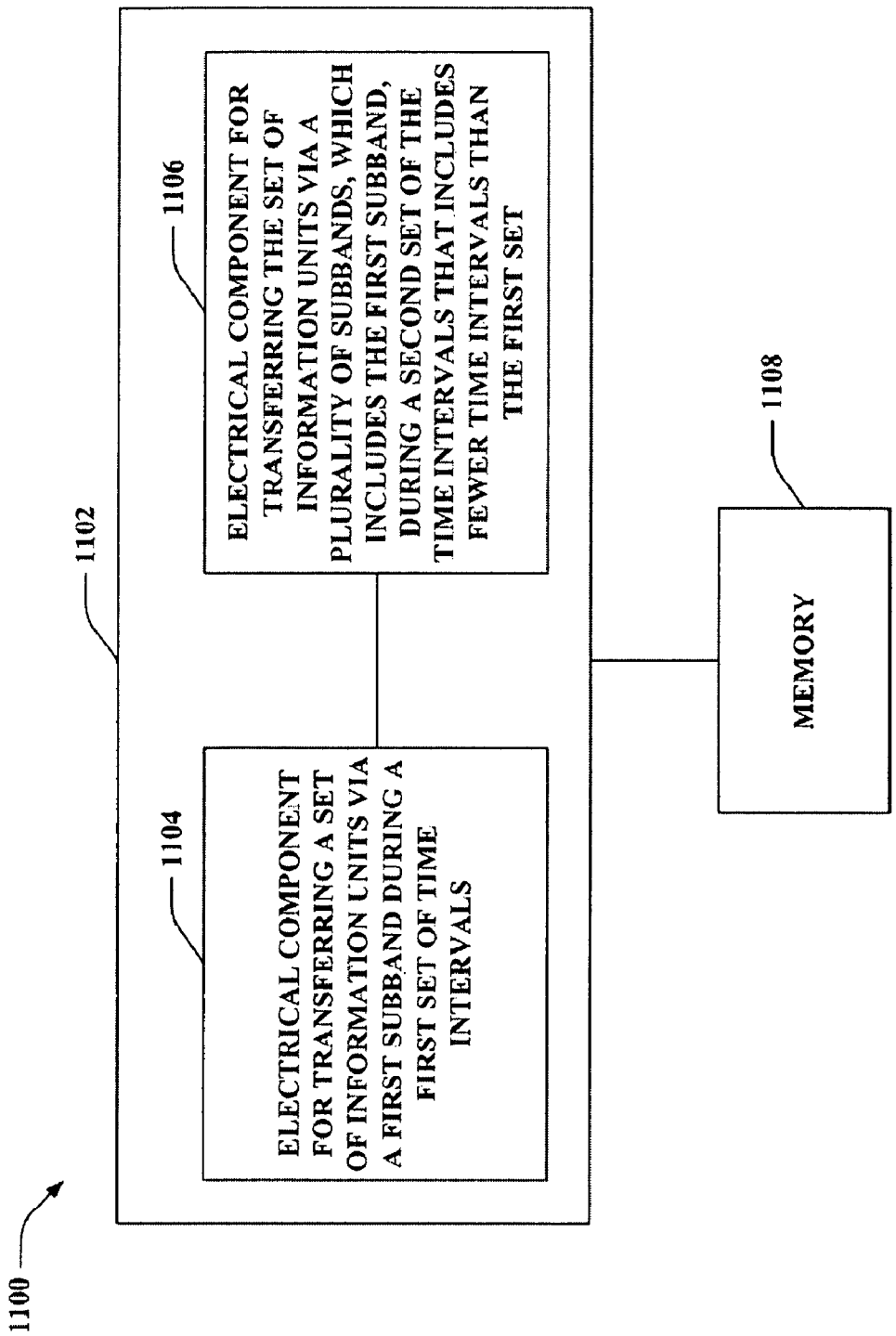
FIG. 11 is an illustration of an example system that enables supporting wideband and narrowband wireless communication devices.

With reference to FIG. 11, illustrated is a system 1100 that enables supporting wideband and narrowband wireless communication devices. For example, system 1100 may reside at least partially within a base station. It is to be appreciated that system 1100 is represented as including functional blocks, which may be functional blocks that represent functions implemented by a processor, software, or combination thereof (e.g., firmware). System 1100 includes a logical grouping 1102 of electrical components that can act in conjunction. For instance, logical grouping 1102 may include an electrical component for transferring a set of information units via a first subband during a first set of time intervals 1104. Pursuant to an illustration, the set of information transferred over the first subband can be utilized by a device (e.g., narrowband wireless terminal) that decodes a portion of the downlink bandwidth to obtain such information. Further, logical grouping 1102 can comprise an electrical component for transferring the set of information units via a plurality of subbands, which includes the first subband, during a second set of the time intervals that includes fewer time intervals than the first set 1106. For example, a device (e.g., wideband wireless terminal) can decode the set of subbands to receive the set of information units. By way of further illustration, such device can receive the set of information units during a shorter period of time as compared to a narrowband device and/or can obtain additional data transferred over the downlink upon one or more of the subbands. Additionally, system 1100 may include a memory 1108 that retains instructions for executing functions associated with electrical components 1104 and 1106. While shown as being external to memory 1108, it is to be understood that one or more of electrical components 1104 and 1106 may exist within memory 1108.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a base station, the method comprising:
    transmitting, from the base station, first information from a set of information to both a narrowband wireless terminal and a wideband wireless terminal via a first subband, from a set of frequency subbands, during a first time interval in a set of time intervals, said set of information including said first information and a set of additional information; and
    transmitting, from the base station, said additional information to the wideband wireless terminal during said first time interval via additional frequency subbands from said set of frequency subbands.

2. The method of claim 1, further comprising:
    transmitting said additional information to the narrowband wireless terminal via said first subband during additional time intervals in said set of time intervals.

3. The method of claim 2,
    wherein said additional time intervals include a second time interval;
    wherein said set of additional information includes second information; and wherein said transmitting said additional information to the narrowband wireless terminal includes:
        transmitting said second information via the first subband during said second time interval.

4. The method of claim 3, further comprising:
    transmitting said first information to the wideband wireless terminal via a second subband during said second time interval, said second subband being one of said additional frequency subbands.

5. The method of claim 4,
    wherein said additional time intervals further include a third time interval;
    wherein said set of additional information includes third information; and
    wherein the method further comprises:
        transmitting the third information to the wideband wireless terminal via a third subband during said second time interval.

6. The method of claim 5, wherein said third subband is different from a subband that was used during said first time interval to communicate said third information.

7. The method of claim 1, further comprising:
    transmitting different subsets of said set of information to said wideband wireless terminal via said additional frequency subbands during different time intervals in said set of time intervals, said different time intervals following said first time interval.

8. The method of claim 1, further comprising:
inhibiting transmission over said additional frequency subbands during time intervals in the set of time intervals other than said first time interval.

9. The method of claim 1, further comprising transferring supplemental data over said additional frequency subbands during time intervals in the set of time intervals other than the first time interval.

10. A base station, comprising:
at least one processor configured to:
transmit first information from a set of information to both a narrowband wireless terminal and a wideband wireless terminal via a first subband, from a set of frequency subbands, during a first time interval in a set of time intervals, said set of information including said first information and a set of additional information; and
transmit said additional information to the wideband wireless terminal during said first time interval via additional frequency subbands from said set of frequency subbands; and
a memory coupled to said at least one processor.

11. The base station of claim 10, wherein said at least one processor is further configured to:
transmit said additional information to the narrowband wireless terminal via said first subband during additional time intervals in said set of time intervals.

12. The base station of claim 11, wherein said additional time intervals include a second time interval;
wherein said set of additional information includes second information; and
wherein said at least one processor is further configured to transmit, as part of transmitting said additional information to the narrowband wireless terminal, said second information via the first subband during said second time interval.

13. The base station of claim 12, wherein said at least one processor is configured to:
transmit said first information to the wideband wireless terminal via a second subband during said second time interval, said second subband being one of said additional frequency subbands.

14. The base station of claim 13,
wherein said additional time intervals further include a third time interval;
wherein said set of additional information includes third information; and
wherein said at least one processor is further configured to:
transmit said third information to the wideband wireless terminal via a third subband during said second time interval.

15. A base station, comprising:
means for storing information; and
means for transmitting first information from a set of information to both a narrowband wireless terminal and a wideband wireless terminal via a first subband, from a set of frequency subbands during a first time interval in a set of time intervals, said set of information including said first information and a set of additional information;
wherein said means for transmitting are also for transmitting said additional information to the wideband wireless terminal during said first time interval via additional frequency subbands from said set of frequency subbands.

16. The base station of claim 15,
wherein said means for transmitting are also for transmitting said additional information to the narrowband wireless terminal via said first subband during additional time intervals in said. set of time intervals.

17. The base station of claim 16, wherein said additional time intervals include a second time interval and wherein said set of additional information includes second. information, and wherein said. means for transmitting, as part of transmitting said additional information to the narrowband wireless terminal, transmit said second information via the first subband during said second time interval.

18. The base station of claim 15, further comprising:
means for inhibiting transmission over said additional frequency subbands during time intervals in the set of time intervals other than said first time interval.

19. The base station of claim 15,
wherein said means for transmitting are also for transmitting supplemental data over said additional frequency subbands during time intervals in the set of time intervals other than the first time interval.

20. A non-transitory machine-readable medium having stored thereon machine-executable instructions for controlling a communications device, said non-transitory machine-readable medium comprising:
instructions for causing the communications device to transmit first information in a set of information to both a narrowband wireless terminal and a wideband wireless terminal via a first subband, from a set of frequency subbands, during a first time interval in a set of time intervals, said set of information including said first information and a set of additional information; and
instructions for causing the communications device to transmit said additional information to the wideband wireless terminal during said first time interval via additional frequency subbands from said set of frequency subbands; and
wherein said communications device is a base station.

21. The non-transitory machine-readable medium of claim 20, further comprising:
instructions for causing the communications device to transmit said additional information to the narrowband wireless terminal via said first subband during additional time intervals in said set of time intervals.

22. The non-transitory machine-readable medium of claim 21, wherein said additional time intervals include a second time interval and wherein said set of additional information includes second information, and wherein said instructions for causing the communications device to transmit said additional information to the narrowband wireless terminal include instructions for transmitting said second information via the first subband during said second time interval.

23. The non-transitory machine-readable medium of claim 20, further comprising:
instructions for causing the communications device to inhibit transmission over said additional frequency subbands during time intervals in the set of time intervals other than said first time interval.

* * * * *